(12) United States Patent
Ooi et al.

(10) Patent No.: US 6,674,607 B2
(45) Date of Patent: Jan. 6, 2004

(54) METHOD AND APPARATUS FOR DETERMINING HIGH ORDER POLYNOMIALS FOR LINEARIZATION OF POSITION SIGNALS

(75) Inventors: KianKeong Ooi, Singapore (SG); WingKong Chiang, Singapore (SG); Lincheng Xiu, Gaithersburg, MD (US); SiokYin Tan, Singapore (SG); YangQuan Chen, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 389 days.

(21) Appl. No.: 09/873,752

(22) Filed: Jun. 4, 2001

(65) Prior Publication Data

US 2002/0039249 A1 Apr. 4, 2002

Related U.S. Application Data (60) Provisional application No. 60/222,999, filed on Aug. 4, 2000.

(51) Int. Cl.[7] ............................................. G11B 5/596
(52) U.S. Cl. ................................................. 360/78.09
(58) Field of Search ...................... 360/78.09, 78.08, 360/78.14, 78.12, 75, 78.06, 78.04; 318/560, 561, 567, 568.22

(56) References Cited

U.S. PATENT DOCUMENTS

| | | | | |
|---|---|---|---|---|
| 4,786,990 A | * | 11/1988 | Overton et al. | 360/75 |
| 5,982,173 A | | 11/1999 | Hagen | 324/212 |
| 6,031,684 A | * | 2/2000 | Gregg | 360/78.06 |
| 6,091,567 A | * | 7/2000 | Cooper et al. | 360/77.08 |
| 6,369,974 B1 | * | 4/2002 | Asgari et al. | 360/78.14 |
| 6,414,827 B1 | * | 7/2002 | Young et al. | 360/78.09 |
| 6,421,198 B1 | * | 7/2002 | Lamberts et al. | 360/77.04 |
| 6,429,995 B1 | * | 8/2002 | Dobbek et al. | 360/77.08 |
| 6,490,118 B1 | * | 12/2002 | Ell et al. | 360/77.04 |
| 6,522,493 B1 | * | 2/2003 | Dobbek et al. | 360/75 |
| 6,574,070 B2 | * | 6/2003 | Gregg | 360/78.09 |

\* cited by examiner

*Primary Examiner*—David Hudspeth
*Assistant Examiner*—Fred F. Tzeng
(74) *Attorney, Agent, or Firm*—Theodore M. Magee; Westman, Champlin & Kelly, P.A.

(57) ABSTRACT

A method and storage device are provided for initializing a polynomial linearizer in the storage device. The linearizer is initialized by identifying the coefficients of the linearizer polynomial. To reduce the computational intensity of this process, orthogonal-type coefficients for at least two orthogonal polynomials are identified, where the linearizer polynomial is formed as the sum of the orthogonal polynomials. The orthogonal-type coefficients are then combined to identify linearizer coefficients for the linearizer polynomial.

19 Claims, 5 Drawing Sheets

METHOD AND APPARATUS FOR DETERMINING HIGH ORDER POLYNOMIALS FOR LINEARIZATION OF POSITION SIGNALS

CROSS-REFERENCE TO RELATED APPLICATION

This application claims priority from a provisional application filed Aug. 4, 2000 entitled "PIECEWISE HIGH ORDER POLYNOMIAL HEAD LINEARIZATION ALGORITHM USING LEAST MEANS SQUARES ITERATION", and having a Ser. No. 60/222,999.

FIELD OF THE INVENTION

The present invention relates to servo systems in data storage devices. In particular, the present invention relates to the linearization of position error signals.

BACKGROUND OF THE INVENTION

In data storage devices with movable heads, the heads are often positioned based on servo information stored on the storage medium. This servo information is converted into a position signal that indicates the relative position of the head on the disc. Ideally, the position signal is a linear function of the head's position on the medium.

However, it is well known that MR and GMR heads have non-linearity problems and as head sizes have decreased, it has become more and more difficult to generate a linear position signal. Because of this, a number of compensation techniques have been developed in the art to linearize the position signal.

One group of techniques combines different position signals to form a normalized position signal. In particular, such systems rely on a normal position signal and a quadrature position signal that are 90 degrees out of phase with each other. By arithmetically combining the normal and quadrature position signals, the compensation techniques generate a normalized position signal that is more linear than either the normal position signal or the quadrature position signal. Unfortunately, as heads have gotten smaller, such normalization techniques have been unable to provide a fully linear normalized position signal.

Additional linearization techniques include identifying a polynomial that describes the relationship between the non-linear position signal and the head's position. This polynomial description is then used to identify the actual position of the head from the position signal.

One problem with fitting a polynomial to a position signal is that the coefficients of the polynomial must be determined within the disc drive itself and the disc drive has limited computing and memory resources for identifying these coefficients. In addition, since the polynomial is determined within the disc drive, the actual position of the head is unknown during the fitting process. This makes it difficult to identify the relationship between the position signal and the actual position of the head.

SUMMARY OF THE INVENTION

A method and storage device are provided for initializing a polynomial linearizer in the storage device. The linearizer is initialized by identifying the coefficients of the linearizer polynomial. To reduce the computational intensity of this process, orthogonal-type coefficients for at least two orthogonal polynomials are identified, where the linearizer polynomial is formed as the sum of the orthogonal polynomials. The orthogonal-type coefficients are then combined to identify linearizer coefficients for the linearizer polynomial.

DETAILED DESCRIPTION OF ILLUSTRATIVE EMBODIMENTS

Figure 1:
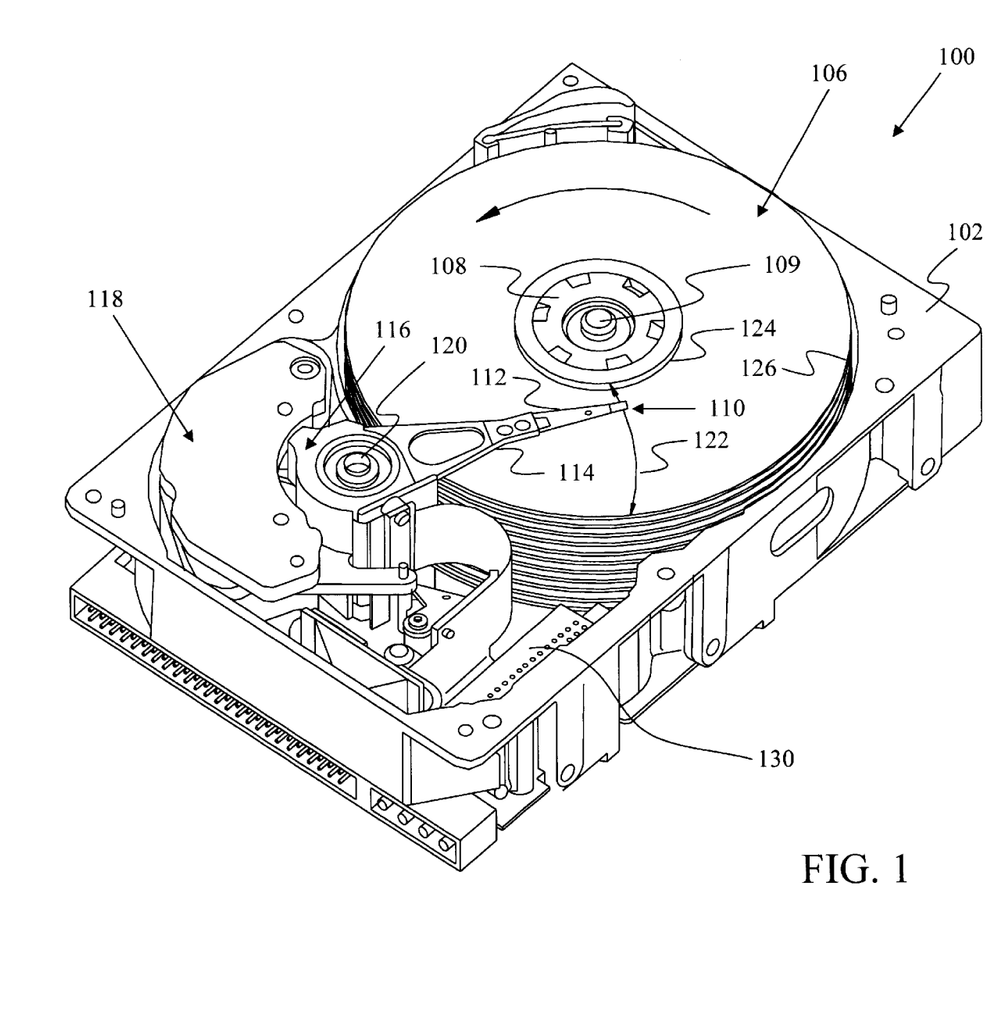
FIG. 1 is an isometric view of a disc drive in which the present invention may be practiced.

FIG. 1 is an isometric view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
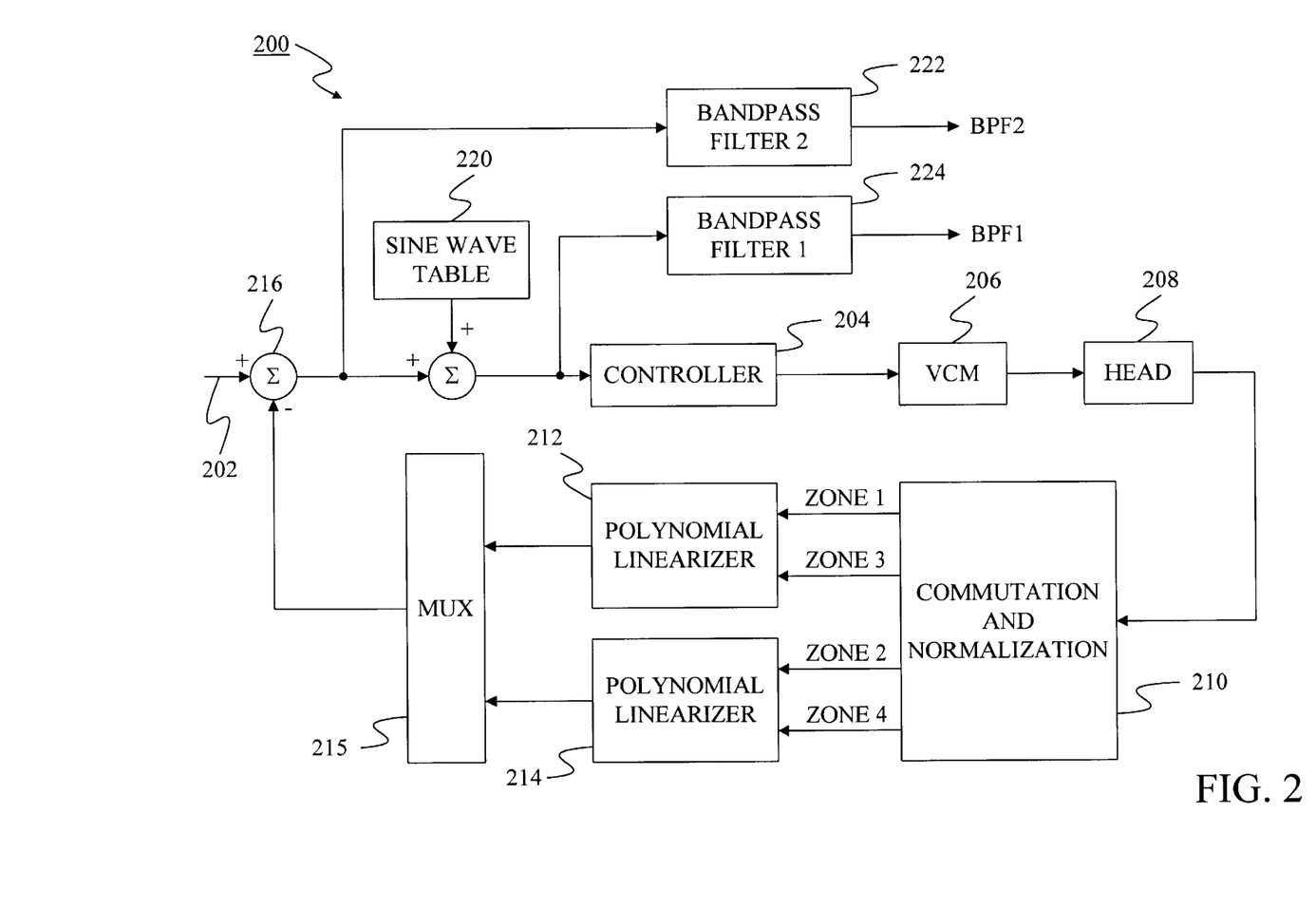
FIG. 2 is a block diagram of a servo loop.

In the disc drive of FIG. 1, the heads are positioned using a servo loop such as servo loop 200 of FIG. 2. In servo loop 200, a reference signal 202 is provided by a host processor (not shown). The reference signal indicates a desired location for the head. This reference signal is passed to a controller 204 which generates a current to drive a voice coil motor 206. The voice coil motor moves a head 208 based on the size of the current provided by controller 204.

When it reaches its new location, head 208 generates one or more position signals from one or more servo fields that are provided to a commutation and normalization unit 210. This unit generates a normalized position signal and identifies which zone of the servo field the head is over. The normalized position signal generated by unit 210 is formed by performing one or more normalization techniques such as NPQ, seamless, and/or NPQ+seamless. Although not specifically mentioned, other normalization techniques may be used within the scope of the present invention.

Figure 3:
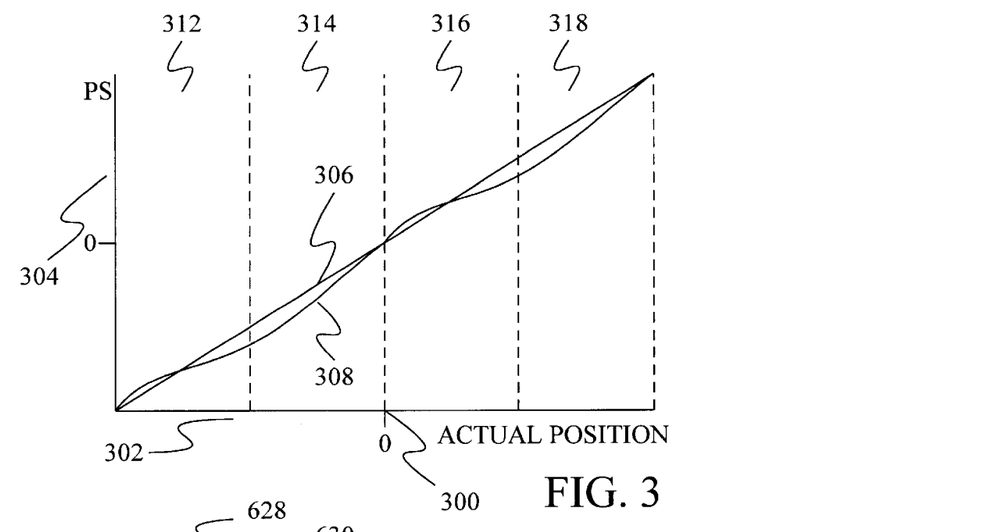
FIG. 3 is a graph of position signal as a function of head location for an ideal and an actual position signal.

FIG. 3 provides a graph of a normalized position signal produced by commutation and normalization unit 210. In FIG. 3, the position of the head relative to a track center 300 is shown along horizontal axis 302. The value of the normalized position signal is shown along vertical axis 304. In FIG. 3, an ideal position signal is shown as a line 306 and the actual normalized position signal is shown as a curve 308.

The graph of FIG. 3 extends across an entire track, which is divided into four zones 312, 314, 316 and 318 that each occupy a quarter track. Zones 312, 314, 316 and 318 are referred to as zone 1, zone 2, zone 3 and zone 4, respectively, in the discussion below. The value of the normalized position signal determined by commutation and normalization unit 210 is output to one of two polynomial linearizers 212 and 214. If the normalized position signal shows that the head is in zone 1 or zone 3 of FIG. 3, the normalized position signal is provided to polynomial linearizer 212. However, if the normalized position signal indicates that head is in zone 2 or zone 4, the normalized position signal is provided to polynomial linearizer 214.

Note that although position signal 308 of FIG. 3 has different shapes in each of the different zones, the shape of the curve in zone 1 is similar to the shape of the curve in zone 3 and the shape of the curve in zone 2 is similar to the shape of the curve in zone 4. Thus, instead of using a separate polynomial for each, the embodiment of FIG. 2 simplifies the process of identifying polynomials by using a single polynomial to describe the shape of the curve in zones 1 and 3 and a different polynomial to describe the shape of the curve in zones 2 and 4.

Polynomial linearizers 212 and 214 provide a position value that indicates the actual position of the head based on the normalized position signal and the polynomial that describes the relationship between the normalized position signal and the actual position. A multiplexer 215, which is under the control of commutation and normalization unit 210, selects the output of the linearizer that received the normalized position signal. Thus, the output of linearizer 212 is selected when the head is in zone 1 or 3, while the output of linearizer 214 is selected when the head is in zone 2 or zone 4.

The output of multiplexer 215 is a position value that is returned to a node 216 where it is combined with reference value 202. Node 216 subtracts the actual position of the head from the reference signal 202 to generate a position error signal that is indicative of the distance between the head and the desired position for the head. Thus, through the feedback loop, the servo loop continues to position head 208 until the position value provided by multiplexer 215 is equal to the reference value provided by the host system.

As noted in the background, one problem with using polynomial linearizers is that a large amount of computational resources are needed in the disc drive in order to calculate the coefficients for the polynomials in the factory process. The present invention overcomes these difficulties by providing a means for determining the polynomial coefficients in a less computationally intensive manner. A method and apparatus used in one embodiment of the present invention for determining the coefficients of the polynomials is shown in the flow diagram of FIG. 4 and the block diagram of FIG. 5.

Figure 4:
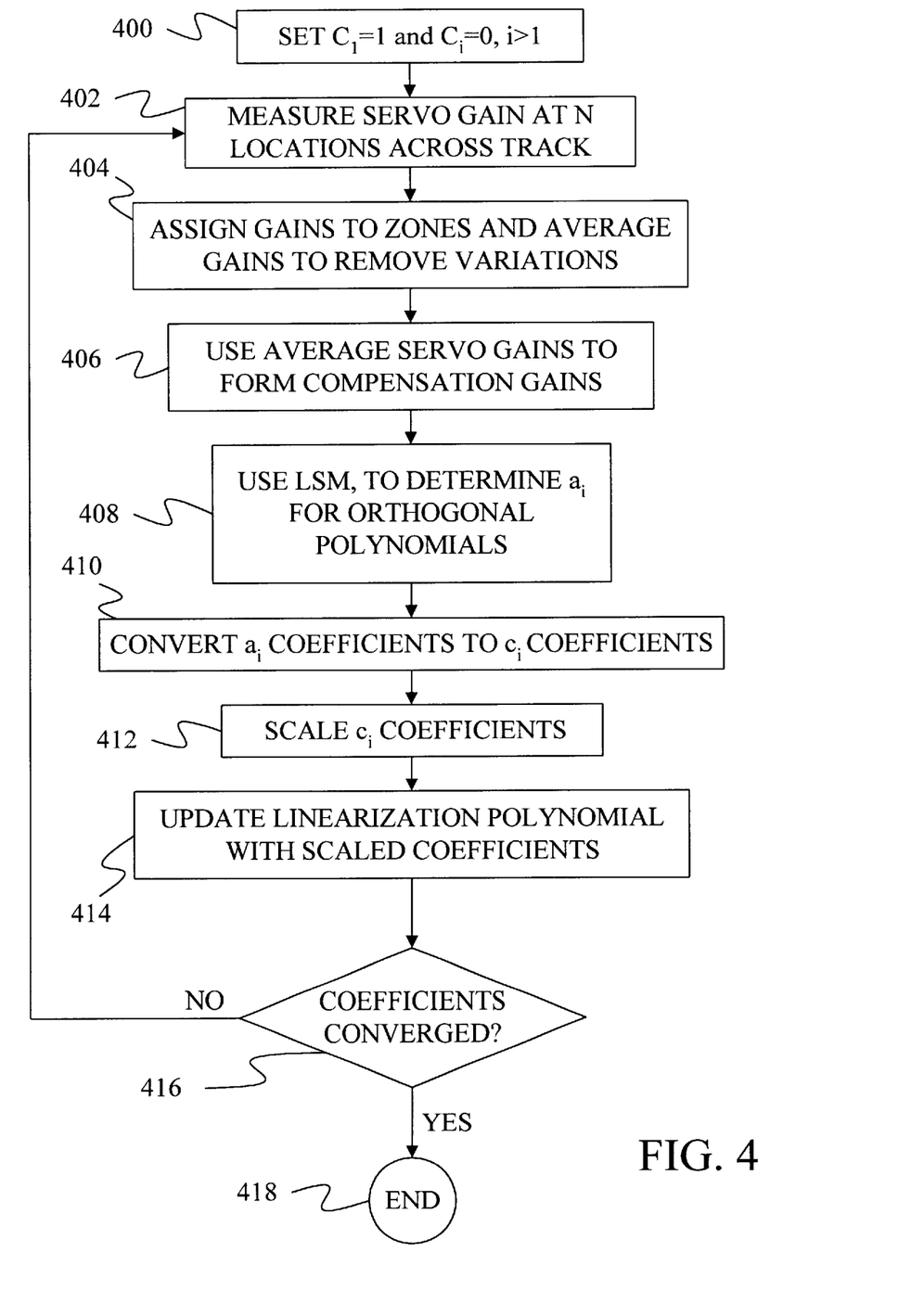
FIG. 4 is a flow diagram for an iterative process under one embodiment of the present invention to identify coefficients for a polynomial.

In the method shown in FIG. 4, the polynomial description of the relationship between the linearized position signal and the normalized position of the head is expressed as:

$$PS(x) = \sum_{i=1}^{m} c_i x^i \qquad \text{EQ. 1}$$

where x is the normalized position of the head, $c_i$ are the coefficients of the polynomial, m is the order of the polynomial, and PS(x) is the position signal which comes from head linearization.

The goal of the method of FIG. 4 is to select the coefficients $c_i$ so that polynomial linearizers 212 and 214 determine a proper actual position given a position signal value. The conversion from a position signal to a compensation gain function of linearizers 212 and 214 can be expressed as:

$$\hat{G}_c(x) = \frac{dPS(x)}{dx} = \sum_{i=1}^{m} i c_i x^{i-1} \qquad \text{EQ. 2}$$

where $\hat{G}_c(x)$ is a calculated compensation gain.

Under the present invention, the coefficients are determined using a least mean square errors calculation that takes the sum of the squared differences between a measured compensation gain at selected positions and the calculated compensation gain determined from the polynomial. This is expressed as:

$$J = \sum_{j=0}^{n} \left( G_c(x_j) - \sum_{i=1}^{m} i c_i x_j^{i-1} \right)^2 \qquad \text{EQ. 3}$$

The best fit polynomial is then determined by minimizing J with respect to each $c_i$. This can be achieved by taking the partial derivative of J with respect to each $c_i$ and setting each derivative to zero. This forms the equation:

$$\frac{\partial J}{\partial c_i} = 0 \qquad \text{EQ. 4}$$

which can be solved for $c_i$.

The difficulty with performing the calculations of EQ. 3 and EQ. 4 is that $G_c(x_j)$ can not be measured directly and the partial derivative of EQ. 4 is computationally intensive. As discussed further below, the present invention overcomes these problems by estimating $G_c(x_j)$ from the open loop gain of the servo system and determining the partial derivative by replacing the polynomial with a set of orthogonal polynomials that provide certain computational advantages.

The process of FIG. 4 starts at step 400 where coefficient $c_i$ is set to 1 and coefficients $c_2$ to $c_m$ are set to 0. At step 402, the gain of the servo loop is determined at n locations across each zone.

To determine the gain of the servo loop, an excitation signal, typically a sine wave, is introduced into the servo loop using a sine wave table 220 of FIG. 2. The frequency of the excitation signal can be any desired frequency with the caveat that a frequency that is too low may cause gain calculation overflow due to high gain. Similarly, a frequency that is too high will create a small gain value with an equally small signal-to-noise ratio that will degrade the accuracy of the gain measurement. The frequency of the excitation signal should also be chosen to avoid frequencies at which the spindle or voice coil motor resonate.

Figure 5:
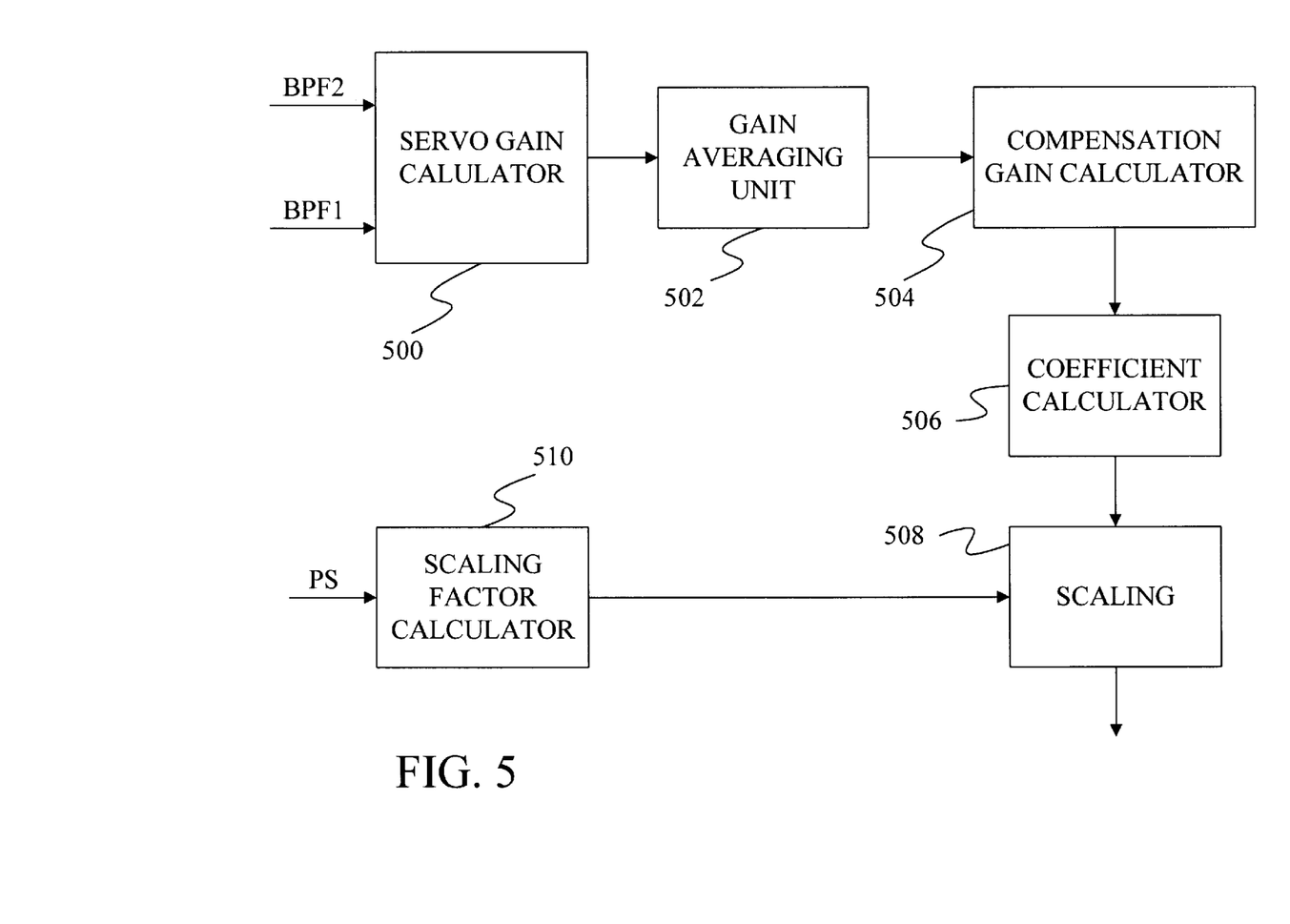
FIG. 5 is a block diagram of elements used to perform the method of FIG. 4.

The gain of servo loop 200 is then determined by a gain calculator 500 of FIG. 5 by taking the ratio of the average peak-to-peak value in the servo loop at a point before the introduction of the excitation signal and the average peak-to-peak value in the servo loop at a point after the introduction of the excitation signal. Under one embodiment, the values are band pass filtered before taking the ratio by passing them through band pass filters 222 and 224 to produce band pass filter output BPF2 and band pass filter output BPF1, respectively. Thus, the gain of the servo loop is calculated as:

$$G_m(x_j) = \frac{BPF2}{BPF1} \qquad \text{EQ. 5}$$

Figure 6:
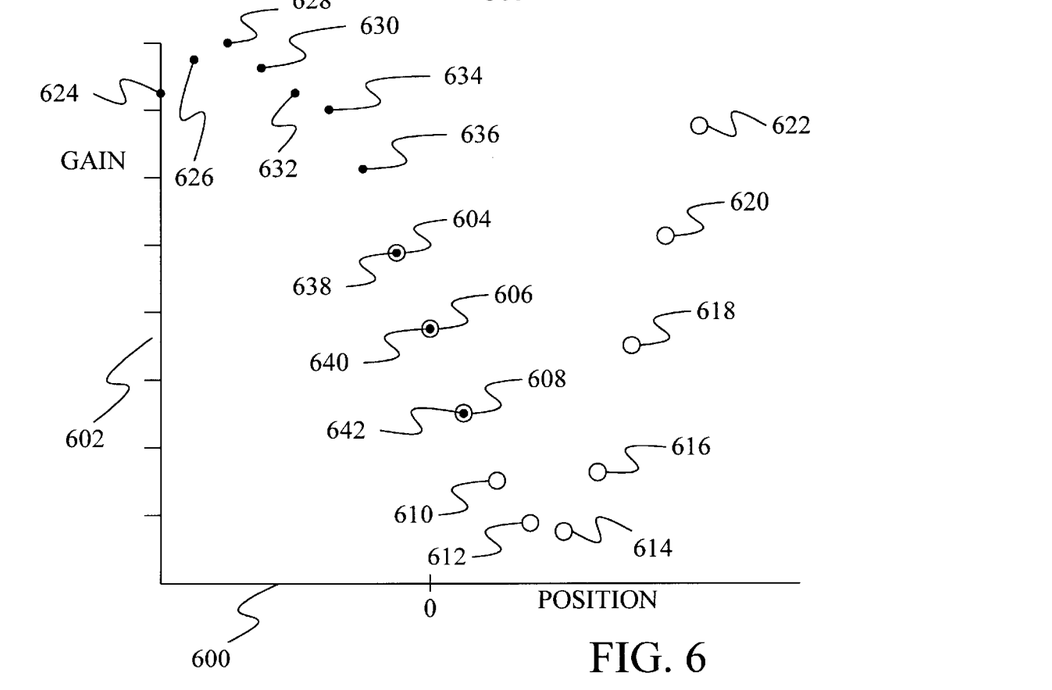
FIG. 6 is a graph of gain points determined between adjacent zones.

To ensure that there is a smooth transition between zones, the gain is measured at points that overlap neighboring zones. This can be seen in FIG. 6 which provides a graph of gain points determined at two neighboring zones. In FIG. 6, head position is shown along horizontal axis 600 and the measured servo loop gain is shown along vertical axis 602. Data points 604, 606, 608, 610, 612, 614, 616, 618, 620 and 622 are collected for one zone while data points 624, 626, 628, 630, 632, 634, 636, 638, 640 and 642 are collected for a second zone. Note that data points 604, 606 and 608 overlap data points 638, 640 and 642, respectively. This overlap helps to smooth the compensation gain calculated under the present invention.

At step 404, the gain measurements for the various zones are averaged by a gain averaging unit 502. This averaging is done to remove non-repeatable gain variations from the collected data. To remove these variations, one embodiment of the present invention utilizes the fact that the gain in zones 1 and 3 should be similar and the gain in zones 2 and 4 should be similar. Thus, at corresponding points in zones 2 and 4, the gain should be substantially the same and similarly, at corresponding points in zones 1 and 3, the gain should be substantially the same. Under one embodiment, eight gain values are determined in each zone at 1/32 track offset from each other. The average gain values for zones 2 and 4 are then calculated as:

$$G_{AVG.M}(x_j) = \frac{G_m(x_{j+8}) + G_m(x_{j+24})}{2}, \quad (j = 0, 1 \ldots 7) \qquad \text{EQ. 6}$$

where $G_{AVG.M}(x_j)$ are average gain values that are used both for zone 2 and zone 4 and j is an index. Note that under the present invention, only one set of gain values is needed since the polynomial coefficients calculated for one zone are applied to the other zone.

Similarly, the average gain values for zones 1 and 3 are calculated as:

$$G_{AVG.M}(x_j) = \frac{G_m(x_{j-8}) + G_m(x_{j+8})}{2}, \quad (j = 8, 9 \ldots 15) \qquad \text{EQ. 7}$$

Note that although equation 7 shows the gain averaged across a single track, in other embodiments the averaging is extended to more than one track and thus to more than two zones.

At step 406 of FIG. 4, a gain compensation calculator 504 of FIG. 5 uses the average gains from equations 6 and 7 to determine a compensation gain. In particular, the compensation gain is determined for each of the index points at which the average servo loop gain was determined. Because the compensation gain can not be measured directly, a simplifying assumption is made that the compensation gain is simply the inverse of the averaged gain of the entire servo loop. In terms of an equation:

$$G_c(x_j) = \frac{1}{G_{AVG.M}(x_j)} \quad (j = 0, 1 \ldots 15) \qquad \text{EQ. 8}$$

The error introduced by this simplifying assumption is corrected by calculating a scaling factor, as described further below.

Once the gain compensation has been calculated for each of the index positions, j, the coefficient of the polynomial is calculated at steps 408 and 410 by a coefficient calculator 506 of FIG. 5. In particular, coefficient calculator 506 uses equations 3 and 4 above to determine the coefficients. Under the present invention, the calculations needed to evaluate equations 3 and 4 are simplified by converting the polynomial into a sum of orthogonal polynomials. Orthogonal polynomials have the following properties:

$$\sum_{j=0}^{n} P_l(j) * P_k(j) = 0, \quad (l \neq k) \qquad \text{EQ. 9}$$

$$\sum_{j=0}^{n} P_l(j) * P_k(j) = \sum_{j=0}^{n} P_k^2(j) \neq 0, \quad (l = k) \qquad \text{EQ. 10}$$

where $P_l$ and $P_k$ are orthogonal polynomials of order l and k respectively, j is an equally spaced index with j=0,1 ... n, and n+1 is the number of points at which the polynomials are evaluated. An example of an orthogonal polynomial is:

$$P_m(j) = \sum_{i=0}^{m} (-1)^i \binom{m}{i} \binom{m+i}{i} \frac{(j)^{(i)}}{(n)^{(i)}}, \qquad \text{EQ. 11}$$

where:

$$\binom{m}{i} = \frac{m!}{(m-i)! i!} \qquad \text{EQ. 12}$$

and m is the order of the polynomial, m $\in[0, n]$.

A polynomial of order m can be expressed as a linear combination of orthogonal polynomials. Thus, the polynomial for the compensation gain can be described as a linear combination of orthogonal polynomials. In order to express equation 3 above in terms of a linear combination of polynomials, the relationship between the head position and the index j must be determined. Refer to FIG. 6 for example, data point 604 corresponds to –1/32 track, data point 606 corresponds to track center, data point 608 corresponds to 1/32 track, etc. That relationship is given as:

$$j = 32x_j + 1 \qquad \text{EQ. 13}$$

or $$x_j = \frac{j-1}{32} \qquad \text{EQ. 14}$$

Using the relationships of equations 2, 13 and 14, the gain compensation polynomial can be rewritten as:

$$\hat{G}_c(x) = \sum_{i=1}^{m} ic_i x_j^{i-1} \equiv \hat{G}_c\left(\frac{j-1}{32}\right) \qquad \text{EQ. 15}$$

$$= \sum_{i=1}^{m} ic_i \left(\frac{j-1}{32}\right)^{i-1} = \sum_{i=0}^{m-1} a_i P_i(j)$$

Using the relationship between the linear combinations of polynomials and the gain compensation polynomial, equation 3 can then be rewritten as:

$$J = \sum_{j=0}^{n}\left(G_c\left(\frac{j-1}{32}\right) - \sum_{i=0}^{m-1} a_i P_i(j)\right)^2 \quad \text{EQ. 16}$$

The partial derivative of J is then taken relative to each of the polynomial coefficient $a_i$ and the minimum is found by setting the derivative equal to 0. Because of the properties of orthogonal polynomials, many of the terms in the derivative drop out because they are equal to 0. This results in the following equation for each $a_i$:

$$a_i = \frac{\sum_{j=0}^{n} P_i(j) G_c\left(\frac{j-1}{32}\right)}{\sum_{j=0}^{n} P_i^2(j)} \quad \text{EQ. 17}$$

where $P_i(j)$ and $$\sum_{j=0}^{n} P_i^2(j)$$

are constants that are independent of the gain of the servo loop, and therefor, can be calculated before the servo loop gain is measured.

Once the polynomial coefficients, $a_i$, have been found, the corresponding coefficients $c_i$ of the compensation polynomial can be found through a linear transformation that relates $a_i$ to $c_i$ using equation 15.

Note that the calculation shown in equation 17 is much simpler than calculations used in the prior art for identifying polynomial coefficients. Because of this, the present invention does not require as many computing resources in order to determine the coefficients of the gain compensation polynomial.

Once the polynomial coefficients have been determined at step 410, they must be scaled at step 412 by a scaling unit 508 to account for the fact that the compensation gain was determined based on the simplifying assumption that the gain describing the change in the position signal for a change in the position of the head was equal to the gain of the entire servo loop. This assumption is shown in the following equation:

$$G_m = \frac{PS(x_1) - PS(x_2)}{(x_1 - x_2)} \quad \text{EQ. 18}$$

where $PS(x_1)$ and $PS(x_2)$ are the position signals generated for the head at positions $x_1$ and $x_2$ with equation 1 and $G_m$ is the gain of the servo loop.

In reality, the gain of the servo loop includes a gain component for head 208, normalization unit 210 and linearizers 212 and 214, which can be referred to as a head/linearizer gain $G_{H+L}$ and some other gain component, g, that forms the rest of the servo loop gain, g. Thus, equation 18 can be rewritten as:

$$G_{H+L} \cdot g = \frac{PS(x_1) - PS(x_2)}{(x_1 - x_2)} \quad \text{EQ. 19}$$

Under the present invention, the actual values of the head and linearizer gain, $G_{H+L}$, and the other gain component, g, of the servo loop are not measured. Instead, a desired value for the head and linearizer gain is selected and then the value of g is calculated. Thus, g can be calculated as:

$$g = \frac{PS(x_1) - PS(x_2)}{(x_1 - x_2) G_{H+L}} \quad \text{EQ. 20}$$

Under most embodiments, the head and linearizer gain, $G_{H+L}$, is selected to be unity and the value of the other gain components are calculated using nominal head positions located at plus and minus a quarter track from track center.

Using equations 19 and 20, it can be seen that the polynomial coefficients calculated in steps 408 and 410 are too large by a factor of g. To correct this, each of the coefficients is multiplied by a scaling factor $k_c$ which is defined as:

$$k_c = \frac{1}{g} \quad \text{EQ. 21}$$

The scaling factors are calculated by a scaling factor calculator 510 in FIG. 5 and are applied to the polynomial coefficients by the scaling unit 508 as:

$$C_i = c_i * k_c \quad \text{EQ. 22}$$

for i=1 . . . n.

After the polynomial coefficients have been scaled at step 412, they are applied to the polynomial linearizers 212 and 214 at step 414. At step 416, the gain ratio of maximum $G_c$ over minimum $G_c$ across a track is determined and is compared to past gain ratios to determine if the coefficients have converged. Note that this gain ratio will approach unity when there is perfect linearization. If the coefficients have not converged, the process returns to step 402 to measure a new gain for the servo loop. This iterative process is used because the measured head position, x, during the first iteration is not the actual position of the head. With each iteration, the measured position moves closer to the actual position, thereby providing better accuracy. Another advantage of the iterative process is that it reduces the measurement error, thus filtering out noise. Note that because the coefficients have changed in the linearizers, the gain of the servo loop will change with each iteration. Steps 402, 406, 408, 410, 412 and 414 are then repeated.

During the repetition of step 408, an equation different than EQ. 8 above is used to determine the compensation gain to be applied by the linearizers. In particular, because the linearizers have been updated to provide a gain compensation, the new gain of the servo loop will have a value of:

$$G_m^k = \frac{G_m^{k-1}}{G_c^{k-1}} \quad \text{EQ. 23}$$

where $G_m^k$ is the gain of the servo loop during the next iteration, $G_m^{k-1}$ is the gain of the servo loop on the previous iteration, and $G_c^{k-1}$ is the compensation gain applied by the polynomial linearizer as determined by the previous iteration. Thus, to determine compensation gain to be applied during the next iteration, the following equation is used:

$$G_c^k = \frac{1}{G_m^k} = \frac{G_c^{k-1}}{G_m^{k-1}} \quad \text{EQ. 24}$$

where $G_c^k$ is the compensation gain for the next iteration k.

The iterative process of FIG. 4 continues until the polynomial coefficients converge and the process ends at step 418.

In summary, a method of initializing a polynomial linearizer 212, 214 is provided. The method includes identifying orthogonal-type coefficients for at least two orthogonal polynomials. The orthogonal-type coefficients are combined to identify linearizer coefficients for a polynomial formed from the sum of the at least two orthogonal polynomials. The linearizer coefficients are applied to the polynomial linearizer 212, 214 to initialize the polynomial linearizer.

A data storage device is also provided that includes a head 110 that produces a position signal. A polynomial linearizer 212, 214 converts the position signal into a position based on a linearizer polynomial having linearizer coefficients, which are determined by a coefficient calculator 506. In particular, coefficient calculator 506 identifies the linearizer coefficients by identifying orthogonal-type coefficients for orthogonal polynomials and converting the orthogonal-type coefficients into the linearizer coefficients.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the polynomial linearizer while maintaining substantially the same functionality without departing from the scope and spirit of the present invention. In addition, although the preferred embodiment described herein is directed to a polynomial linearizer for a disc drive data storage device system, it will be appreciated by those skilled in the art that the teachings of the present invention can be applied to other systems, like tape drives or optical drive systems, without departing from the scope and spirit of the present invention.

What is claimed is:

1. A method of initializing a polynomial linearizer in a storage device, the method comprising steps of:
    (a) identifying orthogonal-type coefficients for at least two orthogonal polynomials;
    (b) combining the orthogonal-type coefficients to identify linearizer coefficients for a polynomial formed from the sum of the at least two orthogonal polynomials; and
    (c) applying the linearizer coefficients to the polynomial linearizer to initialize the polynomial linearizer.

2. The method of claim 1 wherein identifying step (a) comprises:
    (a)(i) determining servo loop gain at several locations across a track on a medium;
    (a)(ii) determining a compensation gain based on the servo loop gain; and
    (a)(iii) identifying the orthogonal-type coefficients from the compensation gain.

3. The method of claim 2 wherein step (a)(i) of determining a servo loop gain comprises passing two signals through two respective band pass filters to produce two filtered signals and taking the ratio of some aspect of the two filtered signals to generate a servo loop gain value.

4. The method of claim 2 wherein step (a)(i) of determining a servo loop gain comprises determining the gain at only one frequency.

5. The method of claim 2 wherein step (a)(i) of determining a servo loop gain comprises determining the servo loop gain at at least two locations and averaging the gain at the at least two locations to form an average servo loop gain.

6. The method of claim 5 wherein step (a)(ii) of determining a compensation gain comprises determining a compensation gain from an average servo loop gain.

7. The method of claim 2 wherein identifying step (a) comprises identifying different sets of orthogonal-type coefficients for different zones on a track on a medium.

8. The method of claim 7 wherein step (a)(ii) of determining a compensation gain comprises determining a compensation gain at a point on the medium and using the compensation gain when identifying a first set of orthogonal-type coefficients and when identifying a second set of orthogonal-type coefficients.

9. The method of claim 1 further comprising a step (d) after identifying the linearizer coefficients of identifying a scaling value based on a position signal determined at two respective positions on the medium.

10. The method of claim 9 further comprising a step (e) after the step of identifying the scaling value that comprises multiplying the linearizer coefficients by the scaling value.

11. The method of claim 1 further comprising repeating identifying step (a), combining step (b) and applying step (c) while using the linearized coefficients applied to the polynomial linearizer.

12. The method of claim 1 wherein combining step (b) comprises identifying linearizer coefficients for a polynomial that has an order that is larger than three.

13. A data storage device for retrieving information from a storage medium, the data storage device comprising:
    a head that produces a position signal;
    a polynomial linearizer that converts the position signal into a position based on a linearizer polynomial having linearizer coefficients; and
    a coefficient calculator that identifies the linearizer coefficients of the linearizer polynomial by identifying orthogonal-type coefficients for orthogonal polynomials and converting the orthogonal-type coefficients into the linearizer coefficients.

14. The data storage device of claim 13 further comprising a compensation gain calculator that determines a compensation gain wherein the coefficient calculator identifies the orthogonal-type coefficients based in part on the compensation gain.

15. The data storage device of claim 14 further comprising a servo loop gain calculator that determines a servo loop gain wherein the compensation gain calculator determines the compensation gain based on the servo loop gain.

16. The data storage device of claim 15 further comprising a servo loop gain averaging unit that averages servo loop gains determined at at least two different positions on the storage medium to form an average servo loop gain and wherein the compensation gain calculator determines the compensation gain based on the average servo loop gain.

17. The data storage device of claim 15 wherein the servo loop gain calculator determines the servo loop gain at multiple zones on the medium.

18. The data storage device of claim 15 further comprising a scaling factor calculator that determines a scaling factor based on position signals determined at two positions on the medium and a scaling unit that multiplies the linearizer coefficients by the scaling factor to form scaled linearizer coefficients.

19. A disc drive storage device for retrieving information from a storage medium, the disc drive storage device comprising:
    an actuator and head assembly that moves a head over the storage medium and generates a position signal from the storage medium; and
    position signal linearizer means that form a linearizer polynomial by identifying coefficients for orthogonal polynomials and converting the coefficients for the orthogonal polynomials into coefficients for the linearizer polynomial and that use the linearizer polynomial to identify a head position from the position signal.

* * * * *